(12) United States Patent
Kato (10) Patent No.: US 11,662,545 B2
(45) Date of Patent: May 30, 2023

(54) OPTICAL APPARATUS AND IMAGE PICKUP APPARATUS USING THE SAME

(71) Applicant: CANON KABUSHIKI KAISHA, Tokyo (JP)

(72) Inventor: Yuichiro Kato, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 326 days.

(21) Appl. No.: 17/081,320

(22) Filed: Oct. 27, 2020

(65) Prior Publication Data
US 2021/0124142 A1 Apr. 29, 2021

(30) Foreign Application Priority Data
Oct. 29, 2019 (JP) .............................. JP2019-196641

(51) Int. Cl.
*G02B 7/04* (2021.01)
*B29D 11/00* (2006.01)

(52) U.S. Cl.
CPC .......... *G02B 7/04* (2013.01); *B29D 11/00009* (2013.01)

(58) Field of Classification Search
CPC ...... B29D 11/00009; G02B 7/00; G02B 7/02; G02B 7/04
USPC ...................................................... 359/822
See application file for complete search history.

(56) References Cited

U.S. PATENT DOCUMENTS

| | | | | |
|---|---|---|---|---|
| 5,142,314 A | * | 8/1992 | Ogawa .................. | G05B 19/23 396/87 |
| 9,307,125 B2 | | 4/2016 | Katsumata | |
| 2010/0271711 A1 | * | 10/2010 | Yoshida ............ | G01D 5/34746 356/614 |
| 2013/0015336 A1 | * | 1/2013 | Ohno ................. | G01D 5/34746 250/231.1 |
| 2013/0222669 A1 | * | 8/2013 | Irie ........................ | G03B 17/20 348/333.09 |
| 2014/0254159 A1 | * | 9/2014 | Alfier ..................... | F21V 17/12 362/257 |
| 2020/0018687 A1 | * | 1/2020 | Lavrovsky ......... | G01N 15/1459 |

FOREIGN PATENT DOCUMENTS

| | | |
|---|---|---|
| JP | 2001333305 A | 11/2001 |
| JP | 2016128849 A | 7/2016 |
| JP | 6020583 B2 | 11/2016 |
| WO | 2018051645 A1 | 3/2018 |

* cited by examiner

*Primary Examiner* — William R Alexander
(74) *Attorney, Agent, or Firm* — Rossi, Kimms, McDowell LLP (57) ABSTRACT

Provided is an optical apparatus including: an optical member; a focus motor configured to move the optical member; a lens CPU configured to control the focus motor; an MF ring including a reflection portion and a low reflection portion having a reflectance lower than a reflectance of the reflection portion, and a photo-reflector configured to receive light reflected by the reflection portion, wherein the lens CPU is configured to control the focus motor based on output from the photo-reflector, and the reflection portion has conductivity.

15 Claims, 5 Drawing Sheets

FIG. 7

OPTICAL APPARATUS AND IMAGE PICKUP APPARATUS USING THE SAME

BACKGROUND OF THE INVENTION

Field of the Invention

The present disclosure relates to an optical apparatus and an image pickup apparatus using the optical apparatus.

Description of the Related Art

In recent years, there has been known a system configured to detect a rotation amount of an operation ring provided on an outer periphery of a lens barrel to control an actuator based on the detected rotation amount, to thereby perform zooming or focusing. Further, in order to achieve comfortable zooming or focusing with respect to an operation performed by a user on the operation ring, it is required to detect the rotation amount of the operation ring at high accuracy.

In Japanese Patent No. 6020583, there is disclosed a configuration including an operation ring and a transparent member. The operation ring has, on its inner surface, a reflection surface for reflecting light emitted from a photo-reflector. The transparent member has a plurality of light blocking surfaces for blocking the light, and is arranged on an inner side of the operation ring. Further, in Japanese Patent Application Laid-Open No. 2016-128849, there is disclosed a configuration in which, on an inner surface of an operation ring, glossy surfaces serving as reflection surfaces and non-glossy surfaces serving as light blocking surfaces are alternately formed.

However, when a member different from the operation ring is used to block light as in Japanese Patent No. 6020583, the different member may tilt or partially come off, which may lead to change in light receiving intensity of the photo-reflector. Thus, there is a fear in that the accuracy of detecting the rotation amount of the operation ring may be reduced, and the rotation position may be erroneously recognized. Meanwhile, in the configuration in which the non-glossy surfaces are formed on the operation ring itself as in Japanese Patent Application Laid-Open No. 2016-128849, measures to remove static electricity from the outside are insufficient.

SUMMARY OF THE INVENTION

The present disclosure has an object to provide an optical apparatus including an operation member, with which it is possible to take a measure against static electricity and also improve accuracy of detecting a rotation amount, and to provide an image pickup apparatus using the optical apparatus.

In order to achieve the above-mentioned object, an optical apparatus according to the present disclosure includes: an optical member; a motor configured to move the optical member; a controller configured to control the motor; an operation member including: a reflection portion; and a low reflection portion having a reflectance lower than a reflectance of the reflection portion, and a detector configured to receive light reflected by the reflection portion, wherein the controller is configured to control the motor based on output from the detector, and the reflection portion has conductivity.

It is possible to provide the optical apparatus including the operation member, with which it is possible to take a measure against static electricity and also improve accuracy of detecting a rotation amount, and to provide the image pickup apparatus using the optical apparatus.

Further features of the present invention will become apparent from the following description of exemplary embodiments with reference to the attached drawings.

DESCRIPTION OF THE EMBODIMENTS

First Embodiment

Preferred embodiments of the present invention will now be described in detail in accordance with the accompanying drawings.

In an optical axis direction indicated by the one-dotted chain line in the drawings, an object side of an interchangeable lens 50 (optical apparatus) including an optical system including lenses being optical elements is defined as a front side, and a fixed side of the interchangeable lens 50 to be fixed to a camera main body 70 (image pickup apparatus) in a bayonet manner is defined as a rear side. The interchangeable lens 50 in a first embodiment of the present disclosure is described with reference to FIG. 1 and FIG. 2.

Figure 1:
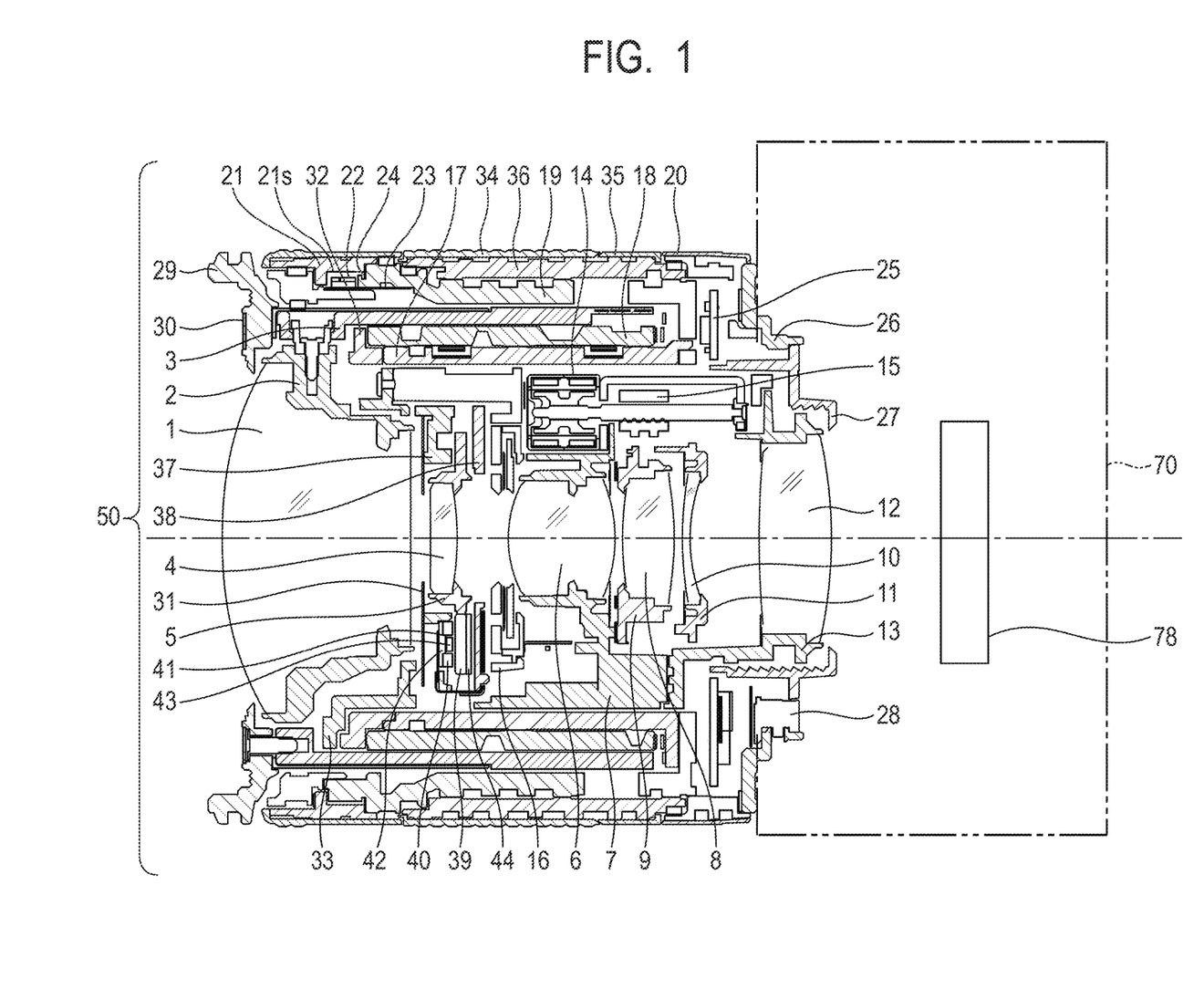
FIG. 1 is a sectional view of an interchangeable lens (50) in a first embodiment in a state in which an overall length decreases (retracting).
Figure 2:
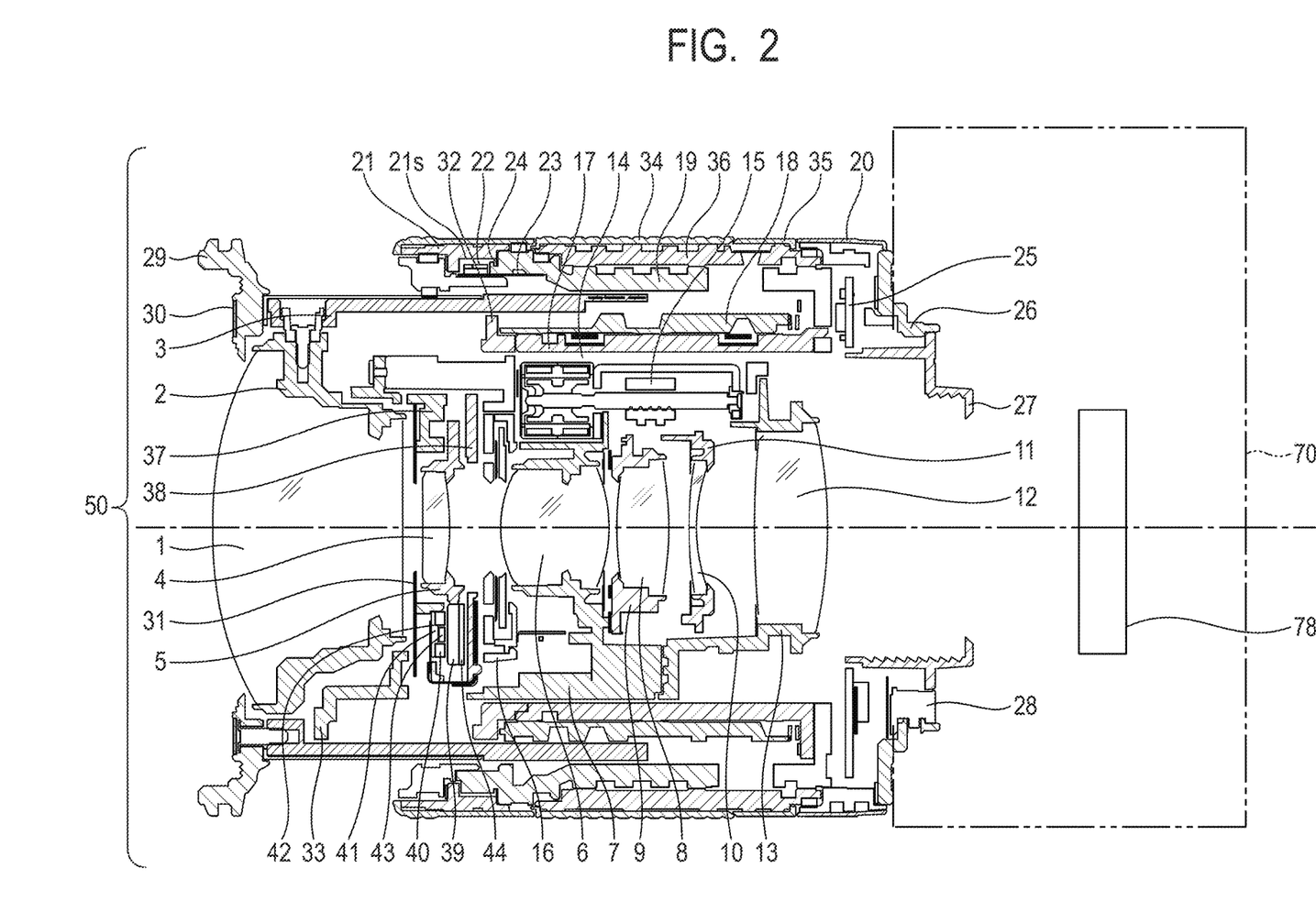
FIG. 2 is a sectional view of the interchangeable lens (50) in the first embodiment in a state in which the overall length increases (TELE).

FIG. 1 is a sectional view of the interchangeable lens 50 in a retracting state in which the overall length of the interchangeable lens 50 decreases. FIG. 2 is a sectional view of the interchangeable lens 50 in a state of TELE in which the overall length of the interchangeable lens 50 increases. A first-group lens 1 being an optical member is held by a first-group lens barrel 2. The first-group lens barrel 2 is held by a first-group barrel 3, and the first-group barrel 3 is configured to move the first-group lens barrel 2 on a plane in an optical axis direction and a direction perpendicular to the optical axis direction for optical adjustment.

As described above, the first-group lens 1 is held by the first-group lens barrel 2, and the first-group lens barrel 2 is held by the first-group barrel 3. A second-group lens 4 corresponds to a correction lens, and is held by a second-group unit 5 serving as a lens holding frame. The second-group unit 5 is configured to move on a plane perpendicular to the optical axis to achieve an optical image stabilization function of correcting so-called camera shake. A third-group lens 6 is held by a third-group lens barrel 7, and the second-group unit 5 having the optical image stabilization function is held on the object side of the third-group lens 6. An aperture unit 16 fixed to the third-group lens barrel 7 is configured to adjust a light amount. After the aperture unit 16 is fixed to the third-group lens barrel 7, the second-group unit 5 is fixed thereto. A fourth-group lens 8 is held by a fourth-group lens barrel 9, and the fourth-group lens barrel 9 is fixed to the third-group lens barrel 7. A focus lens 10 is held by a focus lens barrel 11. The focus lens barrel 11 is supported so as to be movable along the optical axis by a guide mechanism (not shown) provided in the third-group lens barrel 7. A fifth-group lens 12 is held by a fifth-group lens barrel 13.

A focus motor 14 is a driver (drive source) configured to move the focus lens barrel 11. A rack 15 held by the focus lens barrel 11 is threadedly engaged with a screw configured to rotate by the focus motor 14. The screw is driven by the focus motor 14 to rotate, and the rack 15 is moved along threads formed on the screw. Thus, the focus lens barrel 11 holding the rack 15 is moved in the optical axis direction.

The focus motor 14 is a stepping motor in the first embodiment, and is capable of moving the focus lens barrel 11 through pulse input. At this time, a photo-interrupter (not shown) detects an initial position of the focus lens barrel 11, and a controller (microcomputer) to be described later controls the number of pulses from the initial position. In this manner, the focus lens barrel 11 can be moved to a desired focusing position.

A cam ring 18 is rotatably fitted to an outer periphery of a guide barrel 17, and the guide barrel 17 is fixed by a fixed lens barrel 19. A printed circuit board 25 is fixed to the fixed lens barrel 19. On the printed circuit board 25, a driving IC serving as a lens holding frame controller to be described later, a microcomputer, and the like are arranged. A mount 26 is fixed to the fixed lens barrel 19 with screws. An exterior ring unit 20 is fixed while being sandwiched between the fixed lens barrel 19 and the mount 26. A rear cover 27 is fixed to the mount 26.

An MF ring 21 (operation member) is a cylindrical member supported so as to be rotatable about the fixed lens barrel 19 as an axis. A photo-reflector 22 (detector) detects the rotation of the MF ring 21 to output the result as a signal. A flexible circuit board 23 is fixed to the inner surface of the fixed lens barrel 19 to supply power to the photo-reflector 22 and provide the detection signal of the photo-reflector 22 to the printed circuit board 25. The photo-reflector 22 is held by the fixed lens barrel 19 through intermediation of the flexible circuit board 23, and includes a light emitting unit and a light receiving unit.

On the inner surface of the MF ring 21, a reflection surface 21s is formed to reflect light emitted from the photo-reflector 22 to the light receiving unit. When the MF ring 21 is rotated, the light emitted from the photo-reflector 22 is strongly or weakly reflected by the reflection surface 21s, and reflection light having such intensity is received by the light receiving unit of the photo-reflector 22. The photo-reflector 22 outputs each light amount value of the received reflection light to detect the rotation of the MF ring 21, and focusing control of the focus lens 10 is performed based on the rotation direction and the rotation amount of the MF ring 21. Details of the reflection surface 21s are described later.

A washer 24 is a conductor, and is fixed to the rear side of the MF ring 21. The reason why the washer 24 is a conductor is described later. A contact block 28 is connected to the printed circuit board 25 by wiring (flexible circuit board or the like) (not shown), and is fixed to the mount 26 with screws. The interchangeable lens 50 in the first embodiment is fixed to the camera main body 70 with the mount 26 in a bayonet manner. When the interchangeable lens 50 is fixed to the camera main body 70 with the mount 26, the printed circuit board 25 configured to control the operation of each lens can communicate with the camera main body 70 through the contact block 28. An image pickup unit 78 (image pickup element) is mounted to the camera main body 70, and is a photoelectric conversion element such as a CMOS or a CCD, which is configured to receive light having passed through the interchangeable lens 50 from an object to convert the light into an electric signal.

The first-group lens barrel 2 and the first-group barrel 3 are engaged with the cam ring 18 through use of rollers (not shown) arranged on the first-group barrel 3, and can be moved in the optical axis direction along with the rotation of the cam ring 18 about the optical axis. A filter ring 29 can fix accessories such as an ND filter, a protect filter, and a hood, and is fixed to the first-group barrel 3 with screws to move integrally with the first-group barrel 3. A name ring 30 is fixed to the filter ring 29. A mask 31 fixed to the second-group unit 5 is configured to cut unrequired light.

A first key ring 32 is fixed to a leading end of the guide barrel 17 on the object side. Three protrusions (not shown) formed on the first key ring 32 are respectively engaged with three straight grooves (not shown) formed on the inner surface of the first-group barrel 3, to thereby support straight movement of the first-group barrel 3.

The third-group lens barrel 7 is engaged with the cam ring 18 through use of rollers (not shown). Further, the third-group lens barrel 7 can be moved in the optical axis direction along with the rotation of the cam ring 18 about the optical axis, together with the second-group unit 5, the aperture unit 16, the fourth-group lens barrel 9, the focus lens barrel 11, a guide mechanism and a drive mechanism thereof, and the fifth-group lens barrel 13.

A second key ring 33 is fixed to the third-group lens barrel 7. Three protrusions (not shown) formed on the second key ring 33 are respectively engaged with three straight grooves (not shown) formed on the inner surface of the first-group barrel 3, to thereby support straight movement of the third-group lens barrel 7.

A first exterior ring 34 and a second exterior ring 35 are each fixed to an outer surface of a manual zoom ring 36. The manual zoom ring 36 is supported so as to be freely rotatable by the fixed lens barrel 19. The cam ring 18 is coupled to the manual zoom ring 36 through intermediation of cam ring rollers (not shown), and the cam ring 18 is rotated when the user rotates the manual zoom ring 36. On the outer surface of the cam ring 18, cam grooves (not shown) to be engaged with rollers (not shown) arranged on the first-group barrel 3 are formed. Further, on the inner surface of the cam ring 18, cam grooves (not shown) to be engaged with rollers (not shown) arranged on the third-group lens barrel 7 are formed. When the manual zoom ring 36 is rotated, the interchangeable lens 50 is brought into a photographing state of FIG. 2 in which the overall length of the interchangeable lens 50 is increased from a retracting state of FIG. 1. Further, in the photographing state, the lenses have optically desired lens intervals between WIDE and TELE.

The rotation of the manual zoom ring 36 is detected by a sensor (not shown), and a detection signal of the sensor is analyzed by an IC of the printed circuit board 25 so that the rotation amount and the zoom position of the manual zoom ring 36 are determined based on the analysis result. Then, focus, image stabilization, and control of the stop are performed based on the zoom position of the manual zoom ring 36. The manual zoom ring 36 has a lock mechanism (not shown) provided thereto so as to prevent the photographing state from changing to the retracting state simply by rotating the manual zoom ring 36.

A shift base 37 is a fixed member configured to support the second-group unit 5 having the optical image stabilization function so that the second-group unit 5 can be moved on the plane perpendicular to the optical axis. A shift cover 38 is fixed to the shift base 37, and is configured to prevent the second-group unit 5 from coming off toward an image plane side in the optical axis direction from the shift base 37 due to an impact or the like applied to the interchangeable lens 50.

A magnet 39 is fixed to the second-group unit 5 so as to be allowed to move on the plane perpendicular to the optical axis. A coil 40 having a substantially doughnut shape is fixed to the shift base 37. The magnet 39 and the coil 40 form a lens holding frame driver. An air-core portion 41 corresponds to a center hole of the coil 40 having the substantially doughnut shape. The coil 40 is formed by winding a conductive wire member about the air-core portion 41 as a center axis, and is arranged so that the winding axis direction thereof is parallel to the optical axis.

A bobbin 42 holds the coil 40 and a Hall element 43 serving as a lens holding frame position detector. The coil 40 and the Hall element 43 are energized via a terminal (not shown) formed on the bobbin 42. The Hall element 43 is arranged inside the air-core portion 41, and is configured to convert a magnetic flux change into a current to perform position detection of the second-group unit 5. In the first embodiment, without using a magnet dedicated to detection, a dynamic magnetic field from the magnet 39 to be used for driving is detected.

When a signal current is supplied to the coil 40, a Lorentz force is generated by this current and the magnetic flux of the magnet 39, and this Lorentz force serves as a drive force for the second-group unit 5. The magnetic flux change at this time is detected by the Hall element 43, and the detection value of the Hall element 43 is fed back to a lens CPU 51 serving as a lens holding frame controller. The drive control of the second-group unit 5 is thus performed.

A yoke 44 rectifies certain amounts of S and N magnetic fluxes radiated in all directions from the magnet 39 so that the magnetic fluxes are radiated to the coil 40 side at a higher density. Further, the yoke 44 has a role of preventing radiation of magnetic fluxes to the yoke 44 side, that is, the aperture unit 16 side.

Such a lens holding frame driver (drive actuator) is provided in each of a vertical direction (pitch direction) and a horizontal direction (yaw direction). When those drive actuators are appropriately controlled, the second-group unit 5 can be moved to a desired position on the plane perpendicular to the optical axis.

In the first embodiment, the magnet 39 and an aperture unit motor (not shown) serving as a drive source for the aperture unit 16 are arranged at substantially the same position in a phase of the rotation direction about the optical axis. Thus, when the yoke 44 is arranged between the magnet 39 and the aperture unit motor, magnetic interference between the magnet 39 and the aperture unit motor can be prevented or reduced, and this arrangement is a configuration taking into consideration of suppression of reduction in drive actuator performance.

The second-group unit 5 has the above-mentioned configuration, and is thus capable of being driven on the plane perpendicular to the optical axis, but the drive range of the second-group unit 5 is regulated by a mechanical end (not shown). Through use of this mechanical end as a reference position, control of determining the movement center of the second-group unit 5 can be performed.

Figure 3:
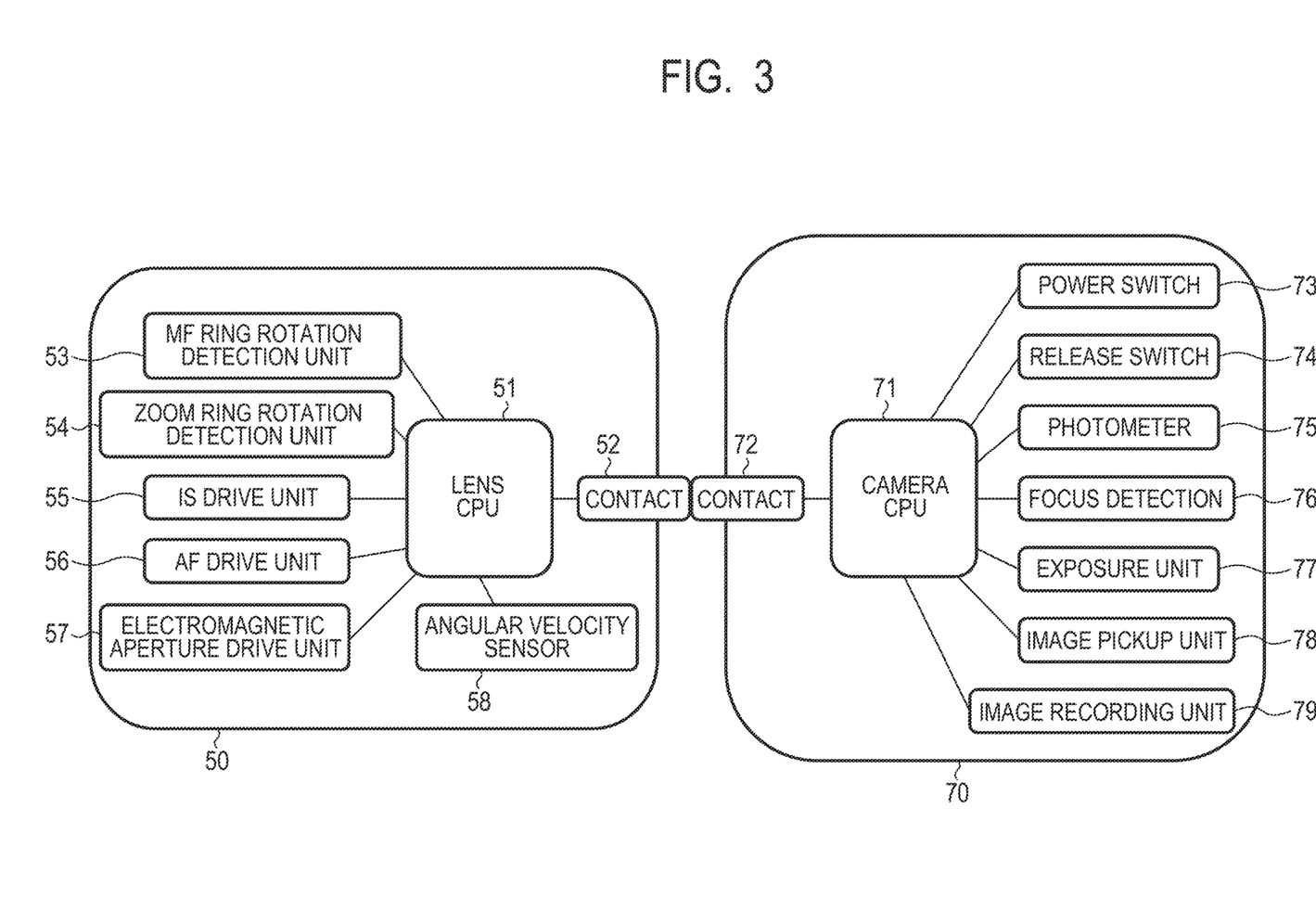
FIG. 3 is a system block diagram of the interchangeable lens (50) in the first embodiment and a camera main body (70).

Next, FIG. 3 shows an electrical configuration of a camera system in the interchangeable lens 50 and the camera main body 70. First, a control flow in the camera main body 70 is described. A camera CPU 71 is formed of a microcomputer. The camera CPU 71 is configured to control an operation of each unit in the camera main body 70. Further, the camera CPU 71 communicates with a lens CPU 51 provided in the interchangeable lens 50 via a lens-side electric contact 52 and a camera-side electric contact 72 when the interchangeable lens 50 is mounted. Information (signal) transmitted by the camera CPU 71 to the lens CPU 51 includes drive amount information, parallel shake information, and focus shake information of the focus lens 10. Further, information (signal) transmitted from the lens CPU 51 to the camera CPU 71 includes image magnification information. The lens-side electric contact 52 and the camera-side electric contact 72 include contacts for supplying power from the camera main body 70 to the interchangeable lens 50.

A power switch 73 is a switch that is operable by a photographer, and can activate the camera CPU 71 and start power supply to each actuator and sensor in the camera system. A release switch 74 is a switch that is operable by a photographer, and includes a first stroke switch SW1 and a second stroke switch SW2. A signal from the release switch 74 is input to the camera CPU 71. The camera CPU 71 is brought into a photographing preparation state based on an input of an ON signal from the first stroke switch SW1. In the photographing preparation state, measurement of an object brightness by a photometer 75 and focus detection by a focus detection unit 76 are performed.

The camera CPU 71 is configured to compute an aperture value of the aperture unit 16 and an exposure amount (shutter speed) of the image pickup element of the image pickup unit 78 based on the result of photometry by the photometer 75. Further, the camera CPU 71 is configured to determine drive amounts (including drive directions) of the focus lens 10 and the focus lens barrel 11 for obtaining a focused state with respect to an object based on focus information, which is a detection result of a focus state of a photographing optical system by the focus detection unit 76. The focus information includes a defocus amount and a defocus direction. The information of the drive amounts described above (drive amount information of the focus lens 10) is transmitted to the lens CPU 51. The lens CPU 51 is configured to control an operation of each component of the interchangeable lens 50.

Further, in a predetermined photographing mode, the camera CPU 71 starts control of shift drive of the second-group unit 5, that is, control of an image stabilization operation. When an ON signal from the second stroke switch SW2 is input, the camera CPU 71 transmits an aperture drive command to the lens CPU 51 and sets the aperture unit 16 to the aperture value computed in advance. Further, the camera CPU 71 transmits an exposure start command to an exposure unit 77 so that a retreating operation of a mirror (not shown) and an opening operation of a shutter (not shown) are performed, and causes the image pickup element of the image pickup unit 78 to perform photoelectric conversion of an object image, that is, an exposure operation.

An image pickup signal from the image pickup unit 78 is converted into a digital signal in a signal processing unit in the camera CPU 71, is further subjected to various types of correction processing, and is output as an image signal. The image signal (data) is recorded and stored in a recording medium such as a semiconductor memory such as a flash memory, a magnetic disk, or an optical disc in an image recording unit 79.

Next, a control flow in the interchangeable lens 50 is described. An MF ring rotation detection unit 53 (photo-reflector 22) is configured to detect rotation of the MF ring 21, and a ZOOM ring rotation detection unit 54 is configured to detect rotation of the manual zoom ring 36.

An IS drive unit 55 includes a drive actuator for the second-group unit 5 configured to perform an image stabilization operation, and a drive circuit of the drive actuator. An AF drive unit 56 performs AF drive of the focus lens barrel 11 via the focus motor 14 in accordance with drive amount information of the focus lens 10 transmitted from the camera CPU 71.

An electromagnetic aperture drive unit 57 is controlled by the lens CPU 51 that receives a aperture drive command from the camera CPU 71 to operate the aperture unit 16 into an aperture state corresponding to a designated aperture value.

An angular velocity sensor 58 is mounted to the interchangeable lens 50, and is connected to the printed circuit board 25. The angular velocity sensor 58 is configured to detect angular velocities of pitch direction shake and yaw direction shake which are angular shake of the camera system, and output the detection values to the lens CPU 51 as angular velocity signals. The lens CPU 51 is configured to electrically or mechanically integrate the angular velocity signals of the pitch direction and the yaw direction from the angular velocity sensor 58, and compute the pitch-direction shake amount and the yaw-direction shake amount which are displacement amounts in respective directions (those are collectively referred to as "angular shake amount").

The lens CPU 51 controls the IS drive unit 55 based on a synthesized displacement amount of the above-mentioned angular shake amount and parallel shake amount such that the second-group unit 5 is driven to be shifted to perform angular shake correction and parallel shake correction. Further, the lens CPU 51 controls the AF drive unit 56 based on a focus shake amount such that the focus lens barrel 11 is driven in the optical axis direction to perform focus shake correction.

Figure 4:
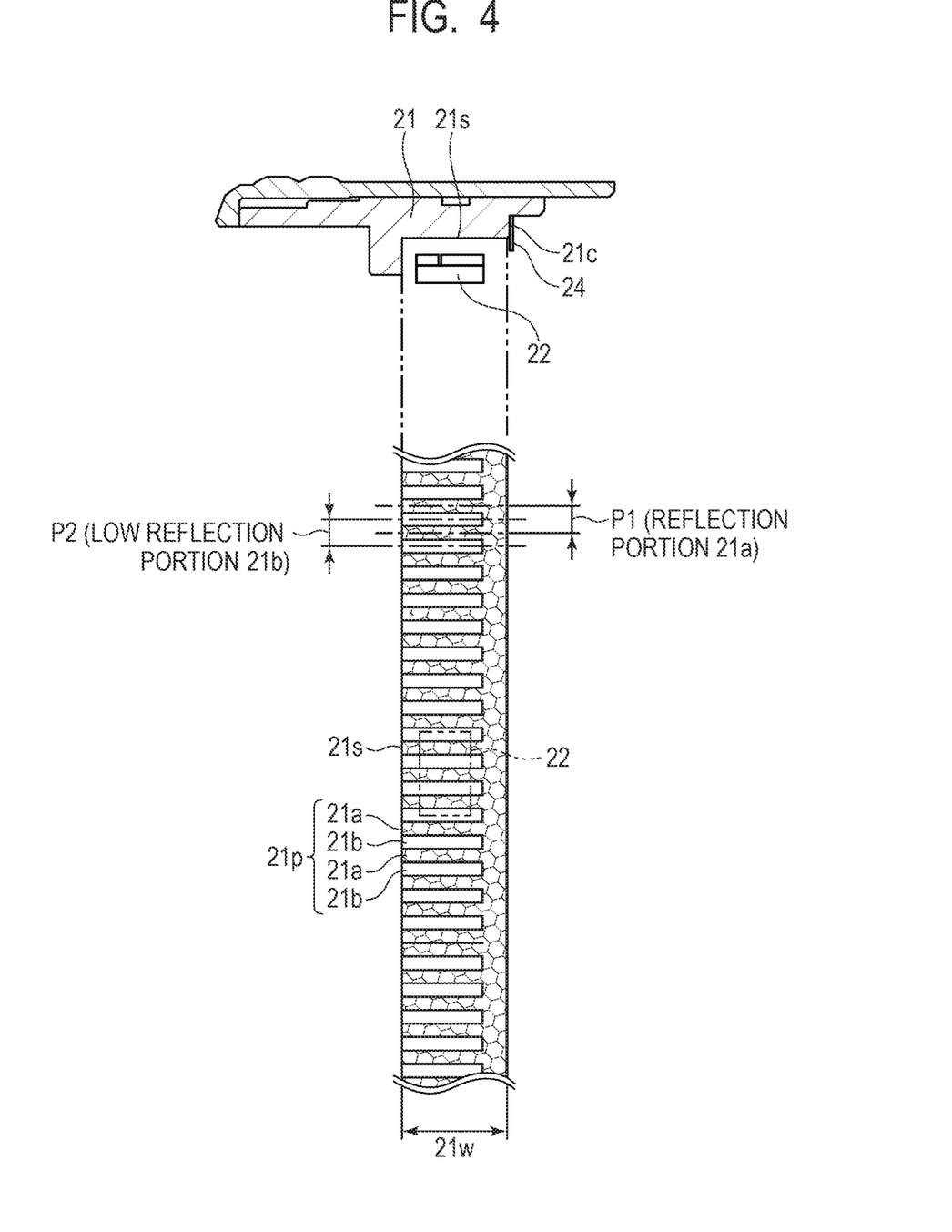
FIG. 4 is a sectional view of an MF ring (21) and a photo-reflector (22) in the first embodiment, and a partially developed view of a reflection surface (21s).

Next, a reflection pattern 21p (circuit pattern) of the reflection surface 21s formed on the inner surface of the MF ring 21 in the first embodiment is described in detail. FIG. 4 is a sectional view of the MF ring 21 and the photo-reflector 22, and a partially developed view of the reflection surface 21s. In FIG. 4, the vertical direction on the drawing sheet corresponds to the rotation direction of the MF ring 21.

On the inner surface of the MF ring 21, in its entire circumference, the reflection surface 21s having a predetermined width 21w is formed to reflect light emitted from the photo-reflector 22. In FIG. 4, the hatched part corresponds to the annular reflection surface 21s. A plurality of outline portions illustrated in the annular reflection surface 21s are low reflection portions 21b, and parts adjacent to the low reflection portions 21b in the rotation direction of the MF ring 21 are reflection portions 21a. That is, the reflection surface 21s is formed as the reflection pattern 21p in which the reflection portions 21a and the low reflection portions 21b configured to reflect light are alternately formed in the operation direction of the MF ring 21.

The low reflection portion 21b has a reflectance lower than that of the reflection portion 21a. A method of manufacturing the MF ring 21 having such a reflection pattern 21p first includes a step of molding the MF ring 21 from a resin material. The formation of the reflection pattern 21p includes a step of subjecting an annular resin surface serving as a part of the inner surface of the MF ring 21 on which the reflection surface 21s is to be formed to emboss processing. Then, areas to be formed into the low reflection portions 21b are left embossed, and a surface treatment step of forming light reflecting surfaces in other parts is performed. Thus, the reflection pattern 21p is formed. As the surface treatment, a conductive material is provided on the surface of the MF ring 21 to form the reflection portions 21a. The low reflection portion 21b has a very small area, and hence the emboss processing cannot be performed only in the areas to be formed into the low reflection portions 21b.

In FIG. 4, a part of the reflection surface 21s formed as the reflection pattern 21p is illustrated as a developed view, but the reflection pattern 21p is formed in the entire circumference of the inner surface of the MF ring 21. The washer 24 serving as a conductor is fixed in abutment against a washer fixing surface 21c.

In the first embodiment, the reflection portions 21a and the low reflection portions 21b are alternately formed at equal pitches (P1=P2) in the rotation direction of the MF ring 21. When the MF ring 21 is rotated, the light emitted from the photo-reflector 22 is repeatedly reflected and weakly reflected by the reflection pattern 21p to strengthen and weaken incident light entering the light receiving unit of the photo-reflector 22. In response to the incident light entering the light receiving unit, the photo-reflector 22 outputs a signal of detecting the rotation position of the MF ring 21. This signal is a square-wave signal being a Hi signal having a predetermined voltage when the light received by the light receiving unit exceeds a certain amount, and being a Low signal when the light received by the light receiving unit does not exceed the certain amount (as a matter of course, the signal is subjected to digital processing or other electrical processing to achieve the square wave). Further, the photo-reflector 22 in the first embodiment is of a type in which two-phase signals having different phases are output from one set of reflection and low-reflection patterns. This signal allows rotation detection of the MF ring 21 at high accuracy.

The reflection pattern 21p in the first embodiment is a circuit pattern having conductivity, in which the reflection portions 21a are formed on the surface of the embossed reflection surface 21s by a molded interconnect device (MID) technology as surface treatment. The MID technology is a processing method of forming a pattern on a resin surface, and is a technology used for, for example, an antenna of a smartphone or LED lighting in recent years. As one example of the processing method, there is a method of modifying the resin surface on which a pattern is desired to be formed by laser and causing a catalyst to adhere thereto for plating. In the MID technology in recent years, various types of MID processing are established, but the processing method is not limited in the first embodiment.

The reflection pattern 21p processed by the MID technology is conductive, but the reflection pattern 21p is not suitable for applications in which a sensor or an actuator is connected thereto to be actively energized. The first embodiment utilizes advantages obtained by the MID technology in that the surface of the reflection surface 21s can be plated to obtain a desired reflectance, and in that the reflection pattern 21p can be processed directly on the surface of the MF ring 21. With the MID technology, the rotation detection of the MF ring 21 by the photo-reflector 22 is achieved without adding other members such as a reflection plate and a light blocking plate. Further, when the reflection pattern 21p is directly formed on the resin surface of the MF ring 21 by laser processing, fine processing (pitch of about 0.1 mm) can be performed, and high accuracy and downsizing can be both achieved.

As a method of forming the reflection pattern 21p without adding other members, for example, printing is conceivable. However, a narrower pitch (P1, P2) is required along with the increase in accuracy of the rotation detection. Further, in consideration of this processing being performed in the entire circumference of the inner surface, it is difficult to perform the processing by a masking tool to be used in the printing. Further, there is a method of increasing a reflectance of a resin component surface (that is, decreasing a surface roughness Ra thereof) by polishing a mold for the MF ring 21 to be formed by resin molding, but, also in this method, it is difficult to perform the processing at a narrow pitch.

In contrast, the reflection pattern 21p in the first embodiment has a shape in which parts of the reflection portions 21a are connected to each other on a side on which the washer fixing surface 21c is formed, and further, the washer fixing surface 21c and the reflection pattern 21p are connected to each other. Further, the reflection pattern 21p is connected to the fixed lens barrel 19 and the mount 26 via the washer 24 being a conductor, and is then grounded to the ground (GND). Thus, all of them have the same potential. That is, the reflection pattern 21p is not actively energized, but has a role as a lightning rod against static electricity from the outside of the MF ring 21 in case of trouble, to thereby prevent the photo-reflector 22 or other sensors from being damaged. Incidentally, the fixed lens barrel 19 is also a conductor, and a resin containing carbon is adopted in the first embodiment.

As described above, the reflection portions 21a and the low reflection portions 21b are alternately formed at equal pitches in the rotation direction of the MF ring 21, but, when the low reflection portions 21b are subjected to matte finish, the MF ring 21 is shaped so that the inner diameter thereof is changed along the optical axis direction. In such a case, the width of each of the reflection portion 21a and the low reflection portion 21b in a direction orthogonal to the optical axis direction may be continuously changed along the optical axis direction so that the equal pitches can be maintained at any thrust position at which the inner diameter of the MF ring 21 is changed.

Second Embodiment

Figure 5:
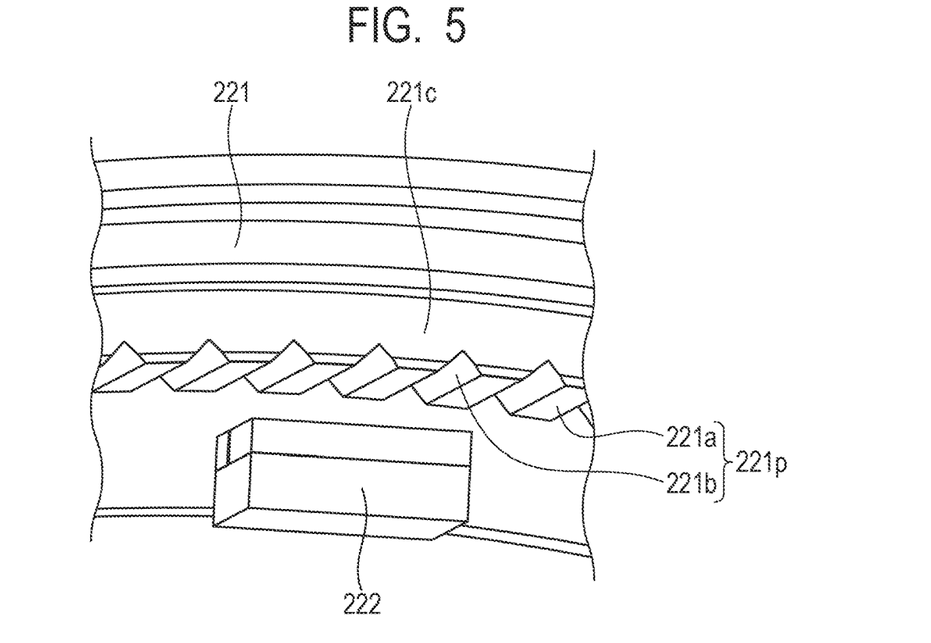
FIG. 5 is a partial perspective view for illustrating configurations of an MF ring (221) and a photo-reflector (222) in a second embodiment.

FIG. 5 is a partial perspective view for illustrating configurations of an MF ring 221 and a photo-reflector 222 in a second embodiment. The configuration of the interchangeable lens 50 is basically similar to that in the first embodiment. Thus, parts having similar configurations are denoted by same reference symbols as those in the first embodiment to omit detailed description thereof, and only different parts are described. The same holds true in third and fourth embodiments to be described later.

Low reflection portions 221b in the second embodiment are formed as concaves on the inner peripheral surface of the MF ring 221. When the low reflection portions 221b are formed as concaves as described above, the reflectance can be further reduced. A plurality of reflection portions 221a formed alternately with the low reflection portions 221b are all connected and conducted to the washer 24 arranged on a washer fixing surface 221c formed on the MF ring 221. That is, a concave-convex portion is formed on the inner peripheral surface of the MF ring 221, and the low reflection portions 221b are formed of concaved portions of the concave-convex portion.

A reflection pattern 221p is formed by a plating processing method or the like. Thus, the reflectance of the reflection portions 221a may vary to cause reduction in reflectance in some cases. In view of the above, the low reflection portions 221b are shaped as concaves, and are further formed so as not to directly face the light emission or light reception of the photo-reflector 222. In this manner, the reflectance of the low reflection portions 221b is further reduced. Thus, the output difference between the Hi signal and the Low signal from the photo-reflector 222 can be reliably ensured. Further, when the low reflection portions 221b are shaped as concaves, the surface can be subjected to matte finish.

Further, the reflectance can be gradually changed by, for example, forming the resin surface of the reflection portion 221a into a wave shape. Thus, the detection signal of the photo-reflector 222 can be not the square wave but an analog sine wave. In this manner, the rotation detection can be performed at higher accuracy.

Third Embodiment

Figure 6:
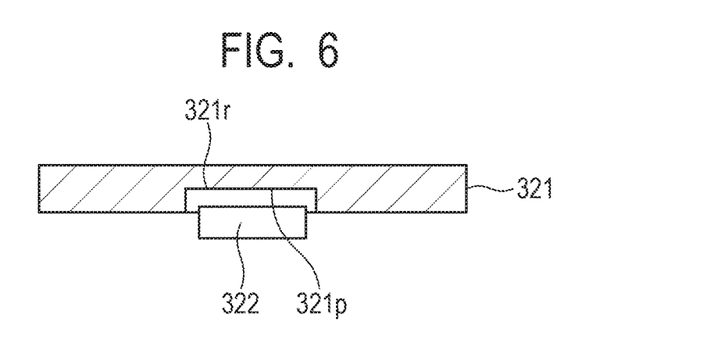
FIG. 6 is a sectional view for illustrating configurations of an MF ring (321) and a photo-reflector (322) in a third embodiment.

FIG. 6 is a partial sectional view for illustrating configurations of an MF ring 321 and a photo-reflector 322 in a third embodiment. On the inner surface of the MF ring 321 in the third embodiment, in its entire circumference, a concaved portion 321r is formed along the rotation direction, and a reflection pattern 321p is formed inside the concaved portion 321r.

When the reflection pattern 321p is formed inside the concaved portion 321r as described above, erroneous operation caused by external light can be prevented. Further, a part of the MF ring 321 can be reduced in thickness in a radial direction, and hence the apparatus can be downsized. The reflection pattern 321p is connected and conducted to the washer 24 arranged on a washer fixing surface (not shown).

Fourth Embodiment

Figure 7:
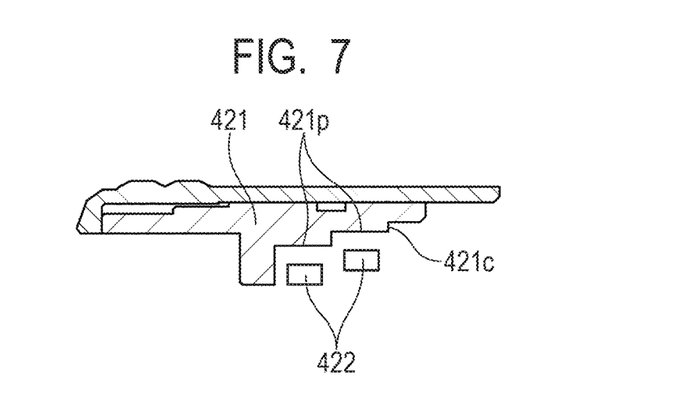
FIG. 7 is a sectional view for illustrating configurations of an MF ring (421) and a plurality of photo-reflectors (422) in a fourth embodiment.

FIG. 7 is a sectional view for illustrating configurations of an MF ring 421 and a plurality of photo-reflectors 422 in a fourth embodiment. In the fourth embodiment, two photo-reflectors 422 are provided, and each have one-phase output. Two reflection patterns 421p (circuits) corresponding thereto are formed. The two reflection patterns 421p are formed to have a level difference at positions different in the radial direction of the MF ring 421. That is, one set of the photo-reflector 422 and the reflection pattern 421p is shifted in the radial direction from another set of the photo-reflector 422 and the reflection pattern 421p, and is different in height in the radial direction. In a 3D-MID technology, even the reflection patterns 421p having different heights can be processed by one step, and hence processing can be performed in accordance with the pitch and the phase of each reflection pattern 421p. Thus, the signals of the photo-reflectors 422 can be output with a desired phase difference. The two reflection patterns 421p are connected and conducted to the washer 24 arranged on a washer fixing surface 421c formed on the MF ring 421.

When the layout allows, it is not required to provide a level difference between the reflection patterns 421p, but the reflection patterns 421p may not be sufficiently ensured due to interference with surrounding components or needs for the external appearance of the MF ring 421 or the like. When the reflection patterns 421p are formed by the 3D-MID technology, there is no problem in terms of accuracy, and moreover, the degree of freedom in layout with respect to other components is increased. In consideration of the above, the interchangeable lens 50 and the camera main body 70 are eventually downsized.

The exemplary embodiments of the present disclosure have been described above. However, the present disclosure is not limited to those embodiments, and various changes and modifications may be made within the gist of the present disclosure. Further, the present disclosure is not intended to limit materials as long as the materials are obtained in consideration of designs and functions. Further, the present disclosure is applied to an optical apparatus including an optical system configured to move an optical member to perform a magnification operation (zoom operation), a focusing operation (focus operation), an image stabilization operation, and a light amount adjustment operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-196641, filed Oct. 29, 2019, which is hereby incorporated by reference herein in its entirety.

What is claimed is:

1. An optical apparatus comprising:
an optical member;
a motor configured to move the optical member;
a controller configured to control the motor;
an operation member including:
  a reflection portion; and
  a low reflection portion having a reflectance lower than a reflectance of the reflection portion, and
a detector configured to receive light reflected by the reflection portion,
wherein the controller is configured to control the motor based on an output from the detector,
the reflection portion has conductivity, and
the reflection portion is grounded.

2. The optical apparatus according to claim 1, wherein the detector is configured to receive light from the reflection portion and light from the low reflection portion to output a light amount value of the light from the reflection portion and a light amount value of the light from the low reflection portion.

3. The optical apparatus according to claim 2, wherein the controller is configured to control the motor based on a difference between the light amount value of the light from the reflection portion and the light amount value of the light from the low reflection portion.

4. The optical apparatus according to claim 1, wherein the operation member is configured to rotate about an optical axis of the optical member.

5. The optical apparatus according to claim 1,
wherein the operation member has a cylindrical shape,
wherein the operation member has an inner diameter that is changed along an optical axis direction, and
wherein each of the reflection portion and the low reflection portion has a width in a direction orthogonal to the optical axis direction, which is changed along the optical axis direction.

6. An optical apparatus comprising:
an optical member;
a motor configured to move the optical member;
a controller configured to control the motor;
an operation member including:
  a reflection portion; and
  a low reflection portion having a reflectance lower than a reflectance of the reflection portion, and
a detector configured to receive light reflected by the reflection portion,
wherein the controller is configured to control the motor based on an output from the detector,
the reflection portion has conductivity, and
the reflection portion and the low reflection portion are formed on an inner peripheral surface of the operation member.

7. An optical apparatus comprising:
an optical member;
a motor configured to move the optical member;
a controller configured to control the motor;
an operation member including:
  a reflection portion; and
  a low reflection portion having a reflectance lower than a reflectance of the reflection portion, and
a detector configured to receive light reflected by the reflection portion,
wherein the controller is configured to control the motor based on an output from the detector,
the reflection portion has conductivity, and
the low reflection portion includes a concaved portion formed on the operation member.

8. The optical apparatus according to claim 1,
wherein the reflection portion comprises a plurality of reflection portions, and
wherein the plurality of reflection portions are arranged at positions different from each other in a radial direction of the operation member.

9. An optical apparatus comprising:
an optical member;
a motor configured to move the optical member;
a controller configured to control the motor;
an operation member including:
  a reflection portion; and
  a low reflection portion having a reflectance lower than a reflectance of the reflection portion, and
a detector configured to receive light reflected by the reflection portion,
wherein the controller is configured to control the motor based on an output from the detector,
wherein the reflection portion comprises a plurality of reflection portions, and
wherein the plurality of reflection portions have conductivity and the same potential.

10. The optical apparatus according to claim 1, further comprising a conductor fixed to the operation member,
wherein the reflection portion is grounded via the conductor.

11. An image pickup apparatus comprising:
an optical apparatus including:
  an optical member;
  a motor configured to move the optical member;
  a controller configured to control the motor;
  an operation member including:
    a reflection portion; and
    a low reflection portion having a reflectance lower than a reflectance of the reflection portion, and
  a detector configured to receive light reflected by the reflection portion,
  wherein the controller being configured to control the motor based on an output from the detector;
  the reflection portion has conductivity;

the reflection portion is grounded; and an image pickup element configured to receive light from the optical member.

12. A method of manufacturing an optical apparatus configured to move an optical member by controlling a motor based on an output from a detector receiving light from an operation member, the method comprising forming, on the operation member, a reflection portion and a low reflection portion having a reflectance lower than a reflectance of the reflection portion, the reflection portion has conductivity, and the reflection portion is grounded.

13. The method of manufacturing an optical apparatus according to claim 12, further comprising:

molding the operation member from a resin material;

subjecting a surface of the operation member to emboss processing to form the low reflection portion; and providing a conductive material on the surface of the operation member to form the reflection portion.

14. An optical apparatus comprising:

an optical member;

an operation member, including:

a reflection portion; and a low reflection portion having a reflectance lower than a reflectance of the reflection portion, and a detector configured to receive light reflected by the reflection portion, wherein the operation member is configured to rotate about an optical axis of the optical member, the reflection portion has conductivity, and the reflection portion is grounded.

15. An image pickup apparatus comprising:

an optical apparatus including:

an optical member;

an operation member including:

a reflection portion; and a low reflection portion having a reflectance lower than a reflectance of the reflection portion, and a detector configured to receive light reflected by the reflection portion, wherein the operation member is configured to rotate about an optical axis of the optical member;

the reflection portion has conductivity;

the reflection portion is grounded; and an image pickup element configured to receive light from the optical member.

\* \* \* \* \*